(12) United States Patent
Huh et al.

(10) Patent No.: US 7,991,898 B2
(45) Date of Patent: *Aug. 2, 2011

(54) USER EQUIPMENT, METHOD AND SYSTEM FOR SIMULTANEOUS SESSION CONTROL

(75) Inventors: Kang-Suk Huh, Gyeonggi-do (KR); Young-Hwan Park, Gyeonggi-do (KR); Chan-Seok Lim, Gyeonggi-do (KR); Jong-Chul Park, Chuengnam (KR); Young-Ae Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 566 days.

This patent is subject to a terminal disclaimer.

(21) Appl. No.: 11/401,367

(22) Filed: Apr. 11, 2006

(65) Prior Publication Data

US 2006/0229094 A1    Oct. 12, 2006

Related U.S. Application Data

(60) Provisional application No. 60/670,423, filed on Apr. 11, 2005, provisional application No. 60/675,608, filed on Apr. 28, 2005.

(30) Foreign Application Priority Data

Dec. 29, 2005    (KR) .................. 10-2005-0134567

(51) Int. Cl.
*G06F 15/16* (2006.01)
*H04B 1/38* (2006.01)

(52) U.S. Cl. ......... 709/228; 709/227; 455/18; 455/90.2; 455/518

(58) Field of Classification Search .................. 709/227, 709/228, 230; 455/18, 90.2, 518
See application file for complete search history.

(56) References Cited

U.S. PATENT DOCUMENTS

| 7,280,502 | B2* | 10/2007 | Allen et al. | 370/329 |
|---|---|---|---|---|
| 7,774,011 | B2* | 8/2010 | Sung et al. | 455/518 |
| 2003/0145054 | A1 | 7/2003 | Dyke | |
| 2004/0249949 | A1 | 12/2004 | Gourraud et al. | |
| 2005/0021616 | A1 | 1/2005 | Rajahalme et al. | |

(Continued)

FOREIGN PATENT DOCUMENTS

JP    2005-80157 A    3/2006

(Continued)

OTHER PUBLICATIONS

Medman, N. Svanbro, K. Synnergren, P, "Ericsson Instant Talk",Ericsson Review, vol. 81(2004):1, pp. 16-19.[retrieved from Internet-Google, http://www.ericsson.com/ericsson/corpinfo/publications/review/2004_01/files/2004012.pdf].*

(Continued)

*Primary Examiner* — Saleh Najjar
*Assistant Examiner* — Lashanya R Nash
(74) *Attorney, Agent, or Firm* — Birch, Stewart, Kolasch & Birch, LLP (57) ABSTRACT

A user equipment (UE), method and system for controlling a simultaneous session are discussed. According to an embodiment, the system includes a UE to transmit a SIP message including simultaneous sessions support (SSS) setting information associated with the UE to a home network including a server; and the server to store the SSS setting information therein, and to set a session operation mode of the server for a simultaneous session of the UE based on, in part, the SSS setting information.

10 Claims, 5 Drawing Sheets

U.S. PATENT DOCUMENTS

| | | | |
|---|---|---|---|
| 2005/0125543 A1* | 6/2005 | Park et al. | 709/227 |
| 2005/0190740 A1* | 9/2005 | Zhao et al. | 370/349 |
| 2005/0262195 A1* | 11/2005 | Ono et al. | 709/203 |
| 2006/0047820 A1* | 3/2006 | Sung et al. | 709/227 |
| 2007/0010275 A1 | 1/2007 | Kiss | |
| 2007/0184867 A1* | 8/2007 | Son et al. | 455/518 |
| 2007/0258477 A1* | 11/2007 | Huh | 370/416 |
| 2009/0157799 A1* | 6/2009 | Sukumaran et al. | 709/203 |
| 2010/0088371 A1 | 4/2010 | Xu et al. | |

FOREIGN PATENT DOCUMENTS

| | | |
|---|---|---|
| JP | 2007-804758 A | 3/2007 |
| KR | 10-2005-0114557 A | 12/2005 |
| RU | 2003134369 A | 3/2005 |
| WO | WO 03/069927 A1 | 8/2003 |
| WO | WO 2004/086715 A1 | 2/2004 |
| WO | WO-2004077796 A2 | 9/2004 |
| WO | WO 2004/086715 A1 | 10/2004 |
| WO | WO 2005/025180 A1 | 3/2005 |
| WO | WO-2006/109964 A1 | 10/2006 |
| WO | WO 2007/037844 A1 | 4/2007 |
| WO | WO 2007/058488 A1 | 5/2007 |

OTHER PUBLICATIONS

Lennox, J.Porta, T. "Implementing Intelligent Network Services With the Session Initiation Protocol" Technical ReportCUCS-002-99, Columbia University, New York, New York. Jan. 1999. [retrieved from the Internet-Google, http://www1.cs.columbia.edu/~lennox/cucs-002-99.pdf].*

Open Mobile Alliance, OMA PoC Control Plane Candidate Version 1.0, Mar. 2005. [retrieved from the Internet "http://www.openmobilealliance.org/Technical/release_program/docs/PoC/v1_0-20050329-C/OMA-TS-PoC-ControlPlane-V1_0-20050317-C.pdf"].*

OMA, Open Mobile Alliance PoC UserPlane, Candidate Version 1.0—Mar. 17, 2005, OMA-TS-POC-ControlPlane-V1-0-20050317-C.

A. Allen et al.:"Private Header (P-Header) Extensions to the Session Initiation Protocol (SIP) for the Open Mobile Alliance (OMA) Push to Talk over Cellular (PoC)"—Feb. 7, 2005, Retrieved from the Internet; URL:http://tools.ietf.org/html/draft-allen-sipping-poc-p-headers-01.

B.S. Goldshtein et al., "IP-telephony, Chapter 7 Session Initiation Protocol—SIP, Moscow, Radio and communication", 2001, pp. 202-221.

Comneon, Ericsson, Motorola, Nokia, Siemens: "Push-To-Talk Over Cellular (PoC), Architecture, PoC Release 2.0"-, Technical Specification, Architecture V2.0.8, Jun. 2004.

Henning Schulzrinne et al., "Application-Layer Mobility Using SIP", Mobile computing and communications Review (MC2R), vol. 4, No. 3, Jul. 2000.

"PoC User Plane Version, Candidate Version 1.0", Internet citation Mar. 17, 2005, XP002361678, Retrieved from Internet: URL:http://www.openmobilealliance.org>.

Neimi et al., "Session Initiation Protocol (SIP) Extension for Event State Publication; rfc3903.txt", IETF Standard, Internet Engineering Task Force, Oct. 1, 2004, XP015009678, pp. 1-33.

Open Mobile Alliance (OMA) "OMA POC Control Plane Candidate Version 1.0—Mar. 17, 2005 Open Mobile Alliance OMA-TS-POC-Controplane-V1 0-20050317", Internet Cit. Mar. 17, 2005, XP007900825.

Rosenberg et al., "SIP: Session Initiation Protocol", Jun. 1, 2002, pp. 1-269 XP015009039.

XP002340306, Open Mobile Alliance, Push to Talk over Cellular (PoC)—Architectures, May 28, 2004, Retrieved from Internet: URL://member openmobilealliance.org/frp/public_documents/POC/Permanent_documents/OMA-Ad-PcC-V1_0-20040528-D.zip>.

* cited by examiner

USER EQUIPMENT, METHOD AND SYSTEM FOR SIMULTANEOUS SESSION CONTROL

This application claims the priority benefits of U.S. Provisional Application No. 60/670,423 filed on Apr. 11, 2005; U.S. Provisional Application No. 60/675,608 filed on Apr. 28, 2005; and Korean Patent Application No. 10-2005-0134567 filed on Dec. 29, 2005 in Republic of Korea. The entire contents of each of these applications are hereby fully incorporated by reference.

BACKGROUND OF THE INVENTION

1. Field of the Invention

The present invention relates to a session-based service of an IP Multimedia Subsystem (IMS), and particularly, to a user equipment (UE), method and system for controlling a simultaneous session for services such as a Push-to-Talk over Cellular (PoC) service.

2. Discussion of the Related Art

In general, in an RFC 3261 document of an Internet Engineering Task Force (IETF), operation methods of Session Initiation Protocol (SIP) servers such as a PoC server may be divided into a SIP proxy method and a Back-to-Back User Agent (B2BUA) method.

Figure 1:
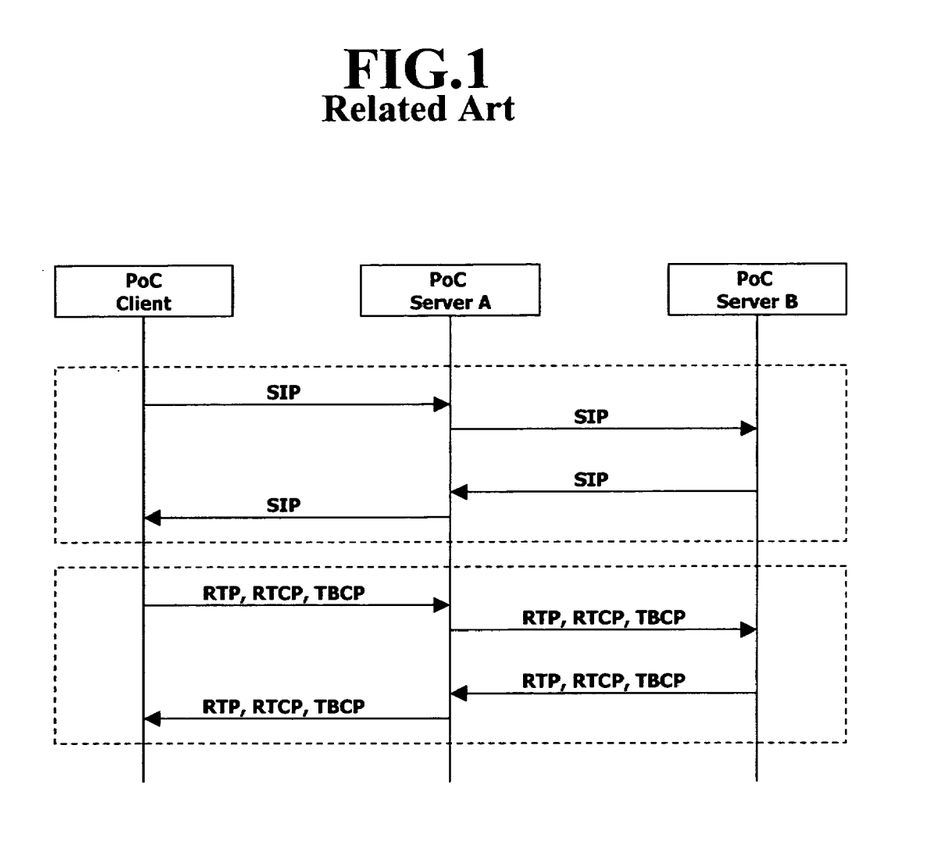
FIG. 1 illustrates a concept of a B2BUA mode according to a related art.
Figure 2:
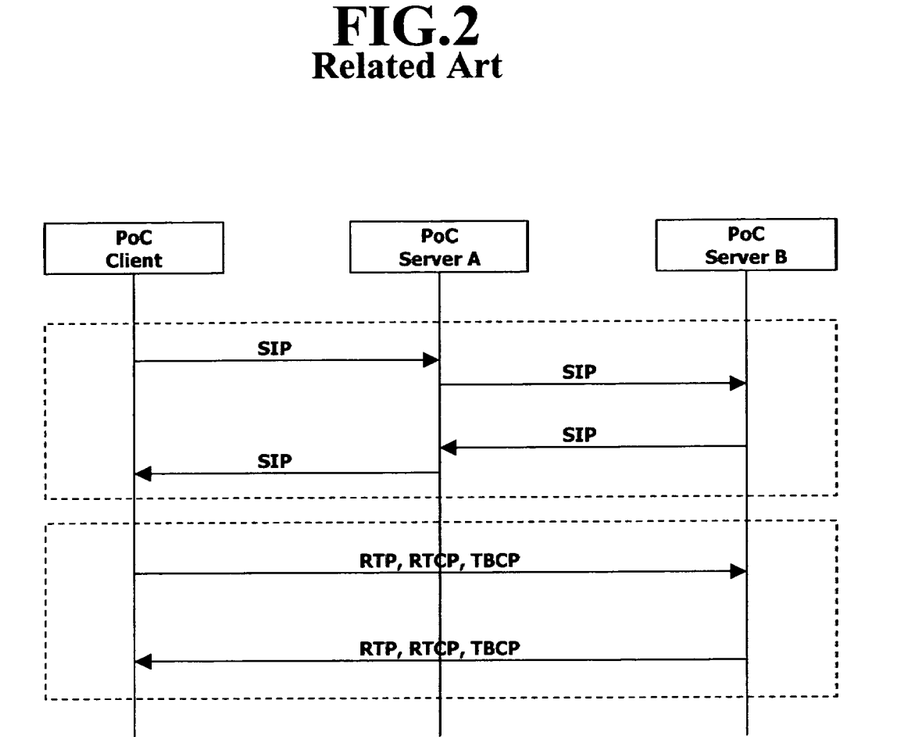
FIG. 2 illustrates a concept of a SIP proxy mode according to a related art.

FIGS. 1 and 2 are flow diagrams for explaining respectively the B2BUA method and the SIP proxy method according to the related art.

As illustrated in FIG. 1, in the B2BUA mode of operation, Real Time Protocol (RTP) data, Real Time Control Protocol (RTCP) data and Talk Burst Control Protocol (TBCP) data as well as SIP messages, which are transmitted and received between a PoC client and a PoC server B (server performing a controlling function), must always pass through a PoC server A (server performing a participating function). Similarly, as illustrated in FIG. 2, in the SIP proxy mode of operation, SIP messages transmitted and received between the PoC client and the PoC server B always pass through the PoC server A. However, in the SIP proxy mode, RTP data, RTCP data and TBCP data do not pass through the PoC server A, but are directly transmitted and received between the PoC client and the PoC server B.

As such, the SIP proxy mode and the B2BUA mode are distinguishable from each other depending on whether the RTP, RTCP and TBCP data pass through the PoC server A. That is, as illustrated in FIG. 1, when the PoC server A operates in a B2BUA mode, RTP, RTCP and TBCP data which are transmitted and received between the PoC client and the PoC server B always pass through the PoC server A. However, as illustrated in FIG. 2, when the PoC server A operates in a SIP proxy mode, RTP, RTCP and TBCP data which are transmitted and received between the PoC client and the PoC server B do not pass through the PoC server A. The PoC server A operating in the SIP proxy mode according to the related art cannot and does not receive the RTP, RTCP and TBCP data from the PoC client or PoC server B, and accordingly can not control such data. However, there are situations when such control is needed.

As known, a PoC server has both a controlling PoC function and a participating PoC function. The controlling PoC function of the PoC server provides a centralized PoC session handling including RTP media distribution, Talk Burst control, policy enhancement for participating in a group session, participant information control, and the like. The participating PoC function of the PoC server provides policy enhancement for incoming PoC sessions, and a PoC session processing for relaying a Talk Burst control message between the PoC client and the PoC server which performs the controlling PoC function. The participating PoC function can relay an RTP media between the PoC client and the PoC server which performs the controlling PoC function.

The participating PoC function of a PoC server (e.g., PoC server A) can support (capable of providing) a 'simultaneous PoC session' for the PoC client. In the present disclosure, a 'simultaneous PoC session' is a session during which the PoC server performs a PoC session priority function or a PoC locking function. The PoC session priority function by the PoC server gives priority to a specific PoC session for the PoC client that has initiated or received invitations to a plurality of PoC sessions. The PoC locking function by the PoC server allows transmission of media data related to only a specific PoC session to the PoC client while holding off transmission of media data associated with other sessions. In this way, the simultaneous PoC session may be said to involve filtering certain data (e.g., RTP data sets) to provide only one RTP data set, e.g., corresponding to the locked session or primary session. Some PoC servers and PoC clients may support the simultaneous PoC session while some PoC servers and PoC clients may not support the simultaneous PoC session.

As an example, assume there are a PoC client and a PoC server that support and carry out a simultaneous PoC session. According to the PoC session priority function, the PoC client sets only one PoC session as Primary one, and other PoC sessions as Secondary ones. Preferably, a value of such PoC session priority is transferred from the PoC client to the PoC server which performs the participating PoC function (e.g., the PoC server A) using an INVITE, RE-INVITE or UPDATE message.

Upon setting the PoC session priority value, the PoC server performing the participating function (PoC server A) transfers data to the PoC client based upon the set PoC session priority value. Namely, once a PoC session is set as Primary, when media data from the primary PoC session is received while the PoC server receives media data from the secondary PoC sessions, the PoC client can immediately receive the media data of the primary PoC session over the media data of the secondary PoC sessions under control of the PoC server A. That is, according to the session priority set by the PoC client, the PoC server A can selectively transmit (transmit or not transmit) media data associated with each PoC session to the PoC client in certain priority order.

On the other hand, according to the PoC locking function, the PoC client sets 'locking' (to be locked) to one PoC session, and thus may receive media data related to only the locked PoC session while it does not receive media data related to other PoC sessions from the PoC server A (server performing the participating function). In this way the locking function blocks out media data of certain PoC sessions. Preferably, the PoC session locking value is transferred from the PoC client to the PoC server A through an INVITE, RE-INVITE or UPDATE message, and is set in the PoC server A. Upon setting the PoC session locking value, the PoC server A determines whether or not to transfer media data to the PoC client on the basis of the set PoC session locking value, and selectively transfers (transfers or not transfers) the media data to the PoC client according to the determination result.

Therefore, in order to perform a simultaneous PoC session (e.g., a PoC session priority function, a PoC locking function, etc.) for a PoC service, as illustrated in FIG. 1, media data including RTP data, RTCP data, TBCP data, etc. need to pass through the PoC server A (performing the participating function) when communicated between the PoC client and the PoC server B (performing the controlling function) since the PoC server A must control the data flow according to the PoC locking function or PoC session priority function. For instance, the PoC server A performing the participating PoC function needs to receive the RTP data (e.g., media data such as voice, video, or the like), which has been transmitted toward the PoC client from the PoC server B performing the controlling PoC function, in the course of transmitting the corresponding data, so that the PoC server A can determine whether to transfer the received RTP data to the PoC client so as to implement the PoC locking function or PoC session priority function.

In other words, to carry out a simultaneous PoC session, the PoC server A which performs the participating PoC function should always operate in the B2BUA mode (and not in the SIP proxy mode), so as to ensure that every media data is passed through the PoC server which performs the participating PoC function. However, in a simultaneous PoC session according to the related art, the PoC server can operate either in the B2BUA mode or the SIP proxy mode and does not know whether the PoC client supports the simultaneous PoC session. When the PoC server which performs the participating PoC function does not operate in the B2BUA mode but operates in the SIP proxy mode when a simultaneous PoC session service is provided, problems may occur as follows.

When a simultaneous PoC session service is provided, if one PoC client is involved in several PoC sessions, the PoC client sets the PoC locking function to one particular PoC session, and thus can request the PoC server performing the participating PoC function to transmit media data associated with only the locked PoC session through the locked PoC session. However, in this case, if the PoC server is operating in a SIP proxy mode, then the media data sent by the PoC server performing the controlling PoC function are sent directly to the PoC client without being passed through the PoC server performing the participating PoC function. Accordingly, the PoC server performing the participating PoC function can not implement the PoC locking function as requested by the PoC client. Similar problems exist when implementing a PoC session priority function of the simultaneous PoC session.

Also, when both the PoC client and the PoC server support the simultaneous PoC session, the PoC server performing the participating PoC function may exist on a media path (e.g., between the PoC client and the PoC server performing the controlling PoC function), and thus performs a relay function of receiving the media data and then transmitting the received media data. However, according to the related art, the PoC server performing the participating PoC function can not recognize whether or not the PoC client supports the simultaneous PoC session. Accordingly, the PoC server performing the participating PoC function can not know the number of maximum simultaneous sessions supported by each PoC client, and thereby cannot properly deal with PoC session settings requested by the PoC client.

Furthermore, such problems can also exist in other types of all IP (internet protocol)-based services (e.g., SIP-based message services) when controlling a simultaneous session (or the like) operation.

SUMMARY OF THE INVENTION

Therefore, an object of the present invention is to provide a simultaneous session control method for a session-based service, and an apparatus and system thereof.

Another object of the present invention is to provide a user equipment (UE), method and system for controlling a simultaneous session (or the like) operation, which address the limitations and disadvantages associated with the related art.

Another object of the present invention is to provide a technique of providing simultaneous sessions support setting information using an IP message in all-IP-based services (e.g., SIP-based services) such as VoIP, Video Telephony, PT (Push-To) service including a PoC service, e-mail, Multimedia Message Service (MMS), Short Message Service (SMS), Instant Message (IM), Immediate Message, etc.

Another object of the present invention is to provide a method in which a PoC client notifies a PoC server performing a participating PoC function of whether or not the PoC client supports a simultaneous session, and thereby an operation mode of the PoC server can be determined.

To achieve these and other advantages and in accordance with the purpose of the present invention, as embodied and broadly described herein, there is provided a simultaneous session control method comprising: transferring simultaneous session support information from a client to a server using a particular message; determining, by the server, whether the client supports the simultaneous session based upon the transferred simultaneous session support information; and determining an operation mode for providing a session-based service by the server according to the determining result.

According to an aspect of the present invention, the particular message indicates a SIP message such as a PUBLISH message, an INVITE message, an UPDATE, REFER, OPTIONS, and the like.

According to another aspect of the present invention, a simultaneous session control apparatus can comprise: a client for transferring simultaneous session support information thereof to a server through a particular message; and a server for determining an operation mode for providing a specific service on the basis of the transferred simultaneous session support information.

According to another aspect of the present invention, there is provided a user equipment (UE) comprising: a controller to determine whether or not the UE supports a simultaneous session, to generate simultaneous sessions support (SSS) setting information according to the determined result, and to send the SSS setting information to a home network of the UE.

According to another aspect of the present invention, there is provided a server comprising: a controller to determine whether a user equipment (UE) supports a simultaneous session based on a session initiation protocol (SIP) message from the UE, to determine whether the server supports the simultaneous session, and to set a session operation mode of the server for a simultaneous session of the UE based on these determination results.

According to another aspect of the present invention, there is provided a communications system comprising: a user equipment (UE) to transmit a session initiation message (SIP) message including simultaneous sessions support (SSS) setting information associated with the UE to a home network including a server; and the server to store the SSS setting information therein, and to set a session operation mode of the server for a simultaneous session of the UE based on, in part, the SSS setting information.

According to another aspect of the present invention, there is provided a simultaneous session control method comprising: determining, by a user equipment (UE), whether or not the UE supports a simultaneous session; generating simultaneous sessions support (SSS) setting information according to the determined result; and sending, by the UE, the SSS setting information in a session initiation message (SIP) message to a home network of the UE.

According to another aspect of the present invention, there is provided a simultaneous session control method comprising: determining, by a server, whether a user equipment (UE) supports a simultaneous session based on a session initiation protocol (SIP) message from the UE; determining, by the server, whether the server supports the simultaneous session; and setting a session operation mode of the server for a simultaneous session of the UE based on these determination results.

According to another aspect of the present invention, there is provided a simultaneous session controlling method for a system including a user equipment (UE) and a server in a home network of the UE, the method comprising: transmitting a session initiation protocol (SIP) message including simultaneous sessions support (SSS) setting information associated with the UE from the UE to the home network; storing the received SSS setting information in the server; and setting a session operation mode of the server for a simultaneous session of the UE based on, in part, the SSS setting information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of the preferred embodiments of the present invention, with reference to the accompanying drawings.

The present invention proposes a method for controlling sessions of a client (or UE) after a server determines an operation mode on the basis of session support information of the client in a session-based service in which the client supports a simultaneous session service and a centralized server controls the simultaneous session service for the client. For example, a PoC service can be considered as one of the session-based services. In the present invention, when the client registers itself in the server or requests session settings from the server, the client notifies the server of simultaneous sessions support information (also referred to herein as simultaneous sessions support setting information) thereof, and thus the server determines an appropriate operation mode (e.g., B2BUA or SIP proxy mode) according to the received simultaneous sessions support setting information so as to control the session settings of the client.

The present invention is intended to fully cover and target services, which are intended to provide rapid communications for service providers and consumers. Services to which the present invention is applicable are communication services in which one UE transmits media data to one or more other UEs. Such services can be all-IP-based services (e.g., all data communicated via IP packet domain) including SIP-based message/communication services, which include but are not limited to, VoIP, Video Telephony, PT services, email, MMS, SMS, Instant Message, Immediate Message and so on. PT services can be a push to talk (PTT) service for transmission of voice (audio) data such as a PoC service, a push to view (PTV) service for transmission of moving picture (video) data, and a push to data (PTD) service for transmission of data. Also the present invention covers both services which need floor (TBCP) control and services which do not need the floor (TBCP) control.

The PT (push to) service, which is intended to provide rapid communications for service providers and consumers of mobile network(s), is a communication service in which one client transmits media data (talk burst) to one or more other clients with which a session has been established. The PT service allows communication with a single recipient (1-to-1) or between groups of recipients as in a group chat session (1-to-many), and uses a session initiation protocol (SIP) to establish a session. The PT service generally include selecting by a specific client one or more clients to invite them to a PT session, connecting a session between the specific client inviting to the PT session and the invited client(s), and transmitting/receiving data between the session-established clients.

In the present invention, a 'simultaneous session' (or the like) is a session during which an applicable server in an all-IP-based service performs a simultaneous session control function such as a session priority function (or the like) or a session locking function (or the like). When applying the invention to a PoC session, the simultaneous session may be referred to as a 'simultaneous PoC session' which is a session during which the PoC server performs a PoC session priority function or a PoC locking function.

As discussed, the present invention is applicable to all-IP-based services or SIP-based message/communication services. Accordingly, the simultaneous session control system and method according to the present invention for all such services are discussed below, but also, to provide an example, the simultaneous session system and method according to the present invention for a PoC service are discussed.

Figure 3:
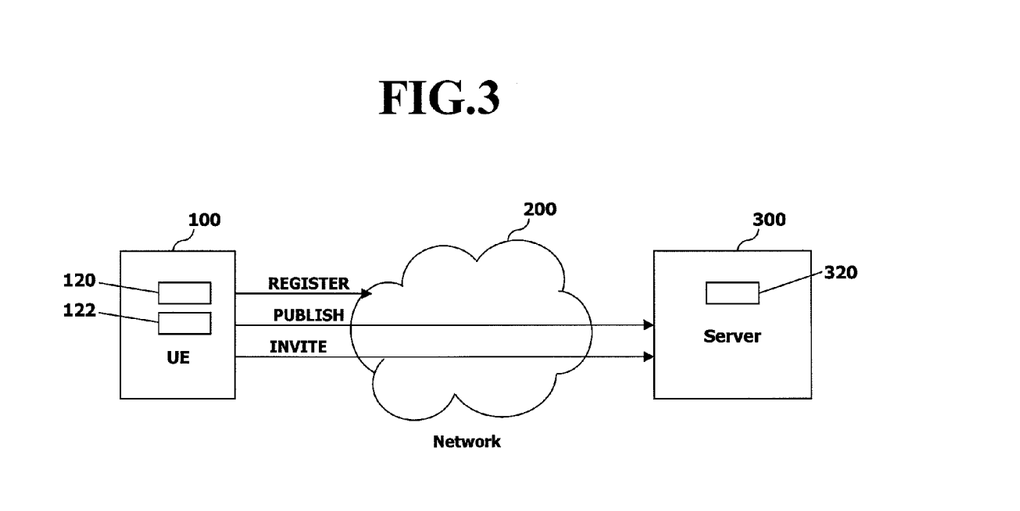
FIG. 3 illustrates a simultaneous session control system according to an embodiment of the present invention.

FIG. 3 illustrates a simultaneous session control system according to an embodiment of the present invention.

As illustrated in FIG. 3, the simultaneous session control system may include a UE (or client) 100 (e.g., PoC client) to transfer simultaneous sessions support information for a simultaneous session to a server through a particular message, and a server 300 (e.g., PoC server performing the participating function) to receive the simultaneous sessions support information from the UE 100 through a network/interface 200 such as a SIP/IP core. The server 300 then determines an operation mode in which the server 300 should provide session-based services on the basis of the received simultaneous sessions support information and on the basis of whether the server 300 itself supports the simultaneous session. The server 300 stores therein information indicating whether or not the server 300 itself supports the simultaneous session (e.g., simultaneous PoC session). Each of the UE 100 and the server 300 includes a controller/processor (120 or 320), and known other components such as a transmitting unit, a receiving unit, etc. For instance, a transmitting/receiving unit 122 is provided in the UE for transmitting and receiving signals. All the components of the simultaneous session control system of the present invention are operatively coupled. The network/interface 200 and the sever 300 may form a home network of the UE 100.

The UE 100 (e.g., the controller 120) transfers the simultaneous sessions support information to the server 300 by including it in a header or body of a SIP message upon registering the information thereof in the server or requesting session settings from the server. Preferably, the simultaneous sessions support information is set as an active value or a not-active value. Preferably, the SIP message that includes the simultaneous sessions support information includes, but is not limited to, a PUBLISH request, an INVITE message, UPDATE, REFER, OPTIONS, etc. These are known SIP messages.

Figure 4:
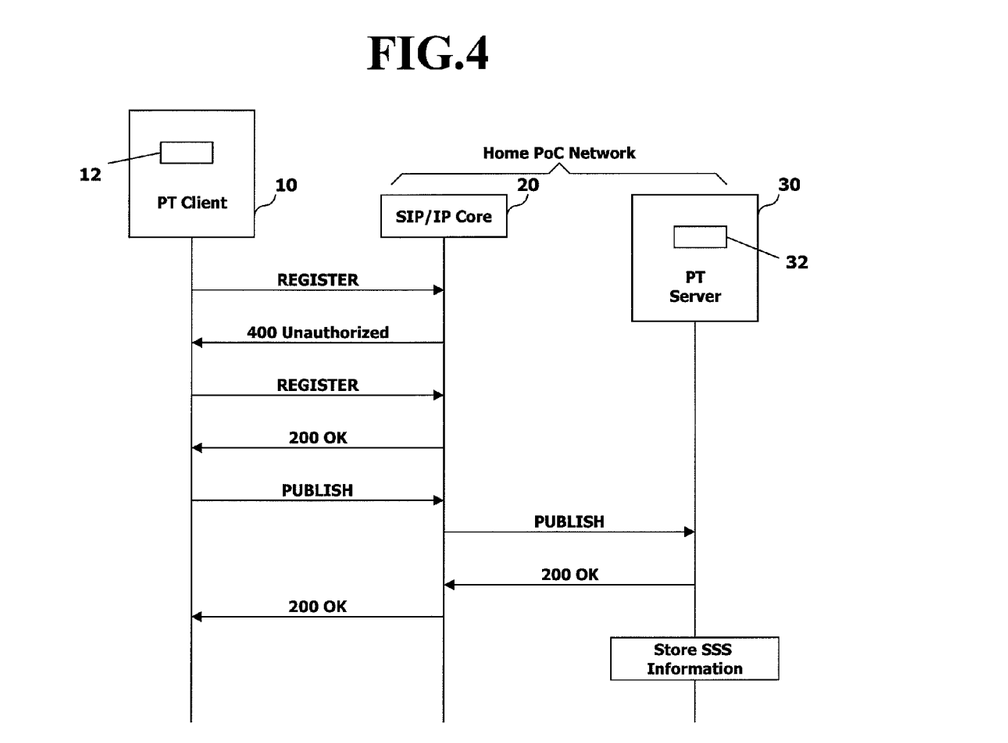
FIG. 4 illustrates a procedure of a SIP registration and of publication of a PoC service setting value usable in the system of FIG. 3 according to an embodiment of the present invention.

FIG. 4 illustrates a procedure for a SIP registration and publication of a PoC service setting value usable in the system of FIG. 3, and provides specifics of the system of FIG. 3 when the invention is applied to a PT (e.g., PoC) service/system. For instance, the PT system of FIG. 4 includes a PoC client 10 (UE), a SIP/IP core 20, and a PoC server (performing a participating PoC function), all operatively coupled. The SIP/IP core 20 and the server 30 form a home PoC network of the client 10. The components 10, 20 and 30 of FIG. 4 are examples of respectively the UE 100, network 200, and server 300 of FIG. 3.

Referring to FIG. 4, according to the present invention, the PoC client 10 requests a registration of its information from the SIP/IP core 20 such as an IMS through a REGISTER message to receive a PoC service, and the SIP/IP core 20 sends a 200 OK message to the PoC client 10 to grant the registration.

Here, if the PoC client 10 supports a simultaneous PoC session, the PoC client 10 must notify a home PoC network of simultaneous PoC sessions support (SSS) information (also referred to herein as SSS setting information) thereof. Preferably, the SSS information has an active or non-active type (value). The active type is set as "true or false" or as "1 or 0". The SSS information indicates whether or not the PoC client 10 supports the simultaneous PoC session, which is a session that supports a PoC session priority function and/or a PoC locking function. For instance, if the SSS information indicates active (e.g., true or 1), this means the PoC client 10 supports the simultaneous PoC session, whereas if the SSS information indicates not active (e.g., false or 0), this means the PoC client 10 does not support the simultaneous PoC session.

From the PoC client 10, the SSS information is sent to the SIP/IP core 20 together with capability information and PoC user's preference information using a PUBLISH request message. Preferably, the SSS information is transferred thereto by being included in a header or body of a SIP message such as the PUBLISH request. This PUBLISH request message (or SIP message) is then transmitted from the SIP/IP core 20 to the PoC server 30. If the home PoC network supports the simultaneous PoC session, the PoC server 30 within the home PoC network must store the SSS information provided from the PoC client 10 through the SIP/IP core 20. Here, the PoC server 30 is a server for performing a participating PoC function, namely, a home PoC server of the PoC client 10.

Therefore, the PoC server 30 sends an 200 OK message to the SIP/IP core 20 and thereafter stores therein the received SSS information together with the capability information and the PoC user's preference information. As a variation, the PoC server 30 can store the SSS information and then (or simultaneously) send the 200 OK message in response to the PUBLISH message.

The PoC client 10 performs a PoC session setting procedure, if necessary, when the 200 OK is received from the SIP/IP core 20.

In this way as shown in FIG. 4, the PoC server 30 can receive SSS information of the PoC client 10 from the PoC client 10 through a SIP message such as a PUBLISH message. Once received, the PoC server 30 can effectively carry out an appropriate simultaneous PoC session control according to the received SSS information.

Figure 5:
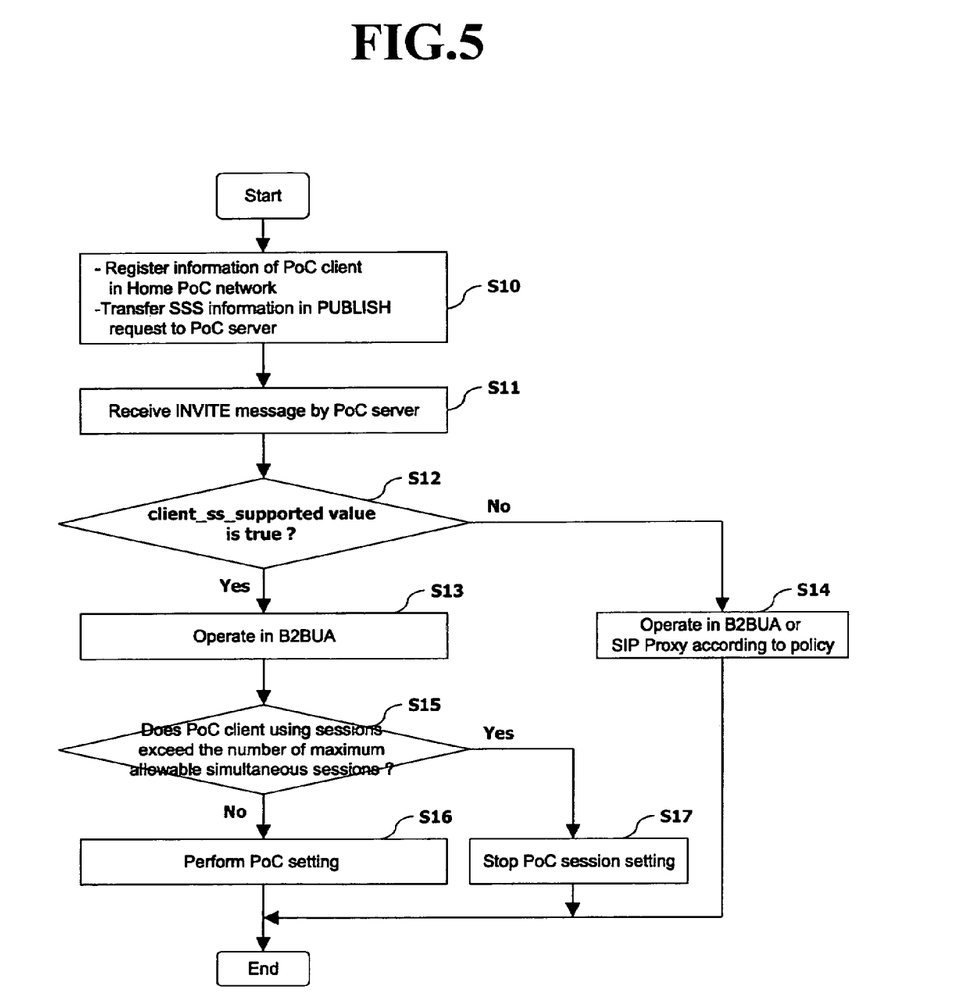
FIG. 5 is a flowchart illustrating an example of a simultaneous session control method for a PoC service according to an embodiment of the present invention.

FIG. 5 illustrates a simultaneous session control method for a PoC server according to an embodiment of the present invention. This method is implemented in the system of FIG. 3 or 4 or can be implemented in other suitable system/device. For instance, the controllers 120 and 320 or 12 and 32 may be used to implement the steps of the method.

As illustrated in FIG. 5, in the IMS, the PoC client (e.g., PoC client 10) registers its information in the home PoC network to receive a PoC service (S10). That is, the PoC client registers its information in a SIP/IP core (e.g., SIP/IP core 20) such as the IMS using a REGISTER message. The SSS information (SSS setting information) of the PoC client is also transmitted from the PoC client to a PoC server for performing a participating PoC function (e.g., server 30) through the SIP/IP core using a PUBLISH message.

That is, if the PoC client supports the simultaneous PoC session, the PoC client notifies the home PoC network of the simultaneous PoC sessions support (SSS) information that indicates that the PoC client supports the simultaneous PoC session. The SSS information is sent together with a PoC service setting value such as capability information and PoC user's preference information through a SIP message such as a PUBLISH message, and has an active type (value) or not-active type. The SSS information is also transferred by being included in a header or body of the SIP message.

Table 1 shows an example of the SSS information transferred through the SIP body by the PoC client. Here, if a parameter value 'client_ss_supported' indicating the SSS information is "true", it indicates that the PoC client supports the simultaneous PoC session, while if "false, it indicates that the PoC client does not support the simultaneous PoC session. Other examples are possible.

TABLE 1

| XML MIM BODY | |
|---|---|
| c= | <?xml version="1.0" encoding="UTF-8"?><br><poc-settings<br>xmlns="urn:oma:params:xml:ns:poc:poc-settings"<br>xmlns:xsi="http://www.w3.org/2001/XMLSchema-instance"<br>xsi:schemaLocation="urn:oma:params:xml:ns:poc:poc-settings"><br><isb-settings><br><incoming-session-barring active="false"><br></isb-settings><br><am-settings><br><answer-mode>automatic</answer-mode> |

TABLE 1-continued

XML
MIM
BODY

```
        </am-settings>
        <ipab-settings>
        <incoming-personal-alert-barring active="false"/>
        </ipab-settings>
        <client-ss-settings>
        <client_ss_supported>true</client_ss_supported>
        </client-ss-settings>
    </poc-settings>
```

Accordingly, if the home PoC client supports the simultaneous PoC session, the PoC server performing a participating PoC function in the home PoC network stores the capability information, the PoC user's preference information and the SSS information provided from the PoC client.

After the capability information, the PoC user's preference information and the SSS information are stored in the PoC server (i.e., the server that performs the participating PoC function (e.g., if the PoC client receives a 200 OK message through the SIP/IP core as shown in FIG. 4), the PoC client sends an INVITE message to the PoC server to request a PoC session setting (S11). Here the PoC server can store the SSS information before or after it transmits the 200 OK message.

Upon receiving the INVITE message from the PoC client, the PoC server checks whether the SSS information such as the parameter value 'client_ss_supported', which is transmitted by the PoC client using the PUBLISH message, is active (e.g., true) (S12), and thus determines whether the PoC client supports the simultaneous PoC session based on the SSS information.

If the value of the parameter 'client_ss_supported' (SSS information) is "true" (or active), the PoC server performing the participating PoC function determines that the PoC client that has sent the INVITE message supports the simultaneous PoC session. The PoC server also checks whether or not the PoC server itself supports the simultaneous PoC session, e.g., by checking its prestored information. If it is determined that both the PoC client and the PoC server support the simultaneous PoC session, the PoC server performing the participating PoC function decides to operate in the B2BUA mode (S13) so that the PoC server can control the data flow as needed for the simultaneous PoC session. That is, in this case, the PoC server operates always in the B2BUSA mode regardless of an operator's policy.

On the other hand, if the value of the parameter 'client_ss_supported' is "false" (or not active), the PoC server performing the participating PoC function determines that the PoC client that has sent the INVITE message does not support the simultaneous PoC session, and thus operates in the B2BUA or SIP proxy mode according to an operator's policy (S14). Generally, in this case, the PoC server operates in the SIP proxy mode. If it is determined that the PoC client supports the simultaneous PoC session, but the PoC server does not support the simultaneous PoC session, then step S14 is performed.

After step S13, in order to process the request of the PoC session settings from the PoC client, the PoC server performing the participating PoC function can determine whether the number of sessions in which the PoC client having sent the INVITE message is participating exceeds the number of maximum allowable simultaneous PoC sessions (S15). The number of maximum allowable simultaneous PoC sessions can be commonly applied to every PoC client.

Considering another method, the PoC server performing the participating PoC function may use the number of maximum simultaneous sessions which are allocated based upon a subscriber's class to determine whether the number of sessions in which the PoC client having sent the INVITE message is participating exceeds the number of maximum allowable simultaneous PoC sessions.

If the number of sessions in which the PoC client is participating does not exceed the number of maximum allowable simultaneous PoC sessions, the PoC server performs the PoC session setting (S16). Otherwise, the PoC server stops the PoC session setting (S17) and then notifies the PoC client of this information. Here, the value indicating the number of the maximum allowable simultaneous PoC sessions can be previously allocated to the PoC server.

Instead of being limited thereto, the PoC server performing the participating PoC function may consider that the PoC client does not support the simultaneous PoC sessions if the 'client_ss_supported' value is not included in the SIP body, namely, in an XML MIME body, while the PoC server may consider that the PoC client supports the simultaneous PoC session if the 'client_ss_supported' value is "true".

Figure 6:
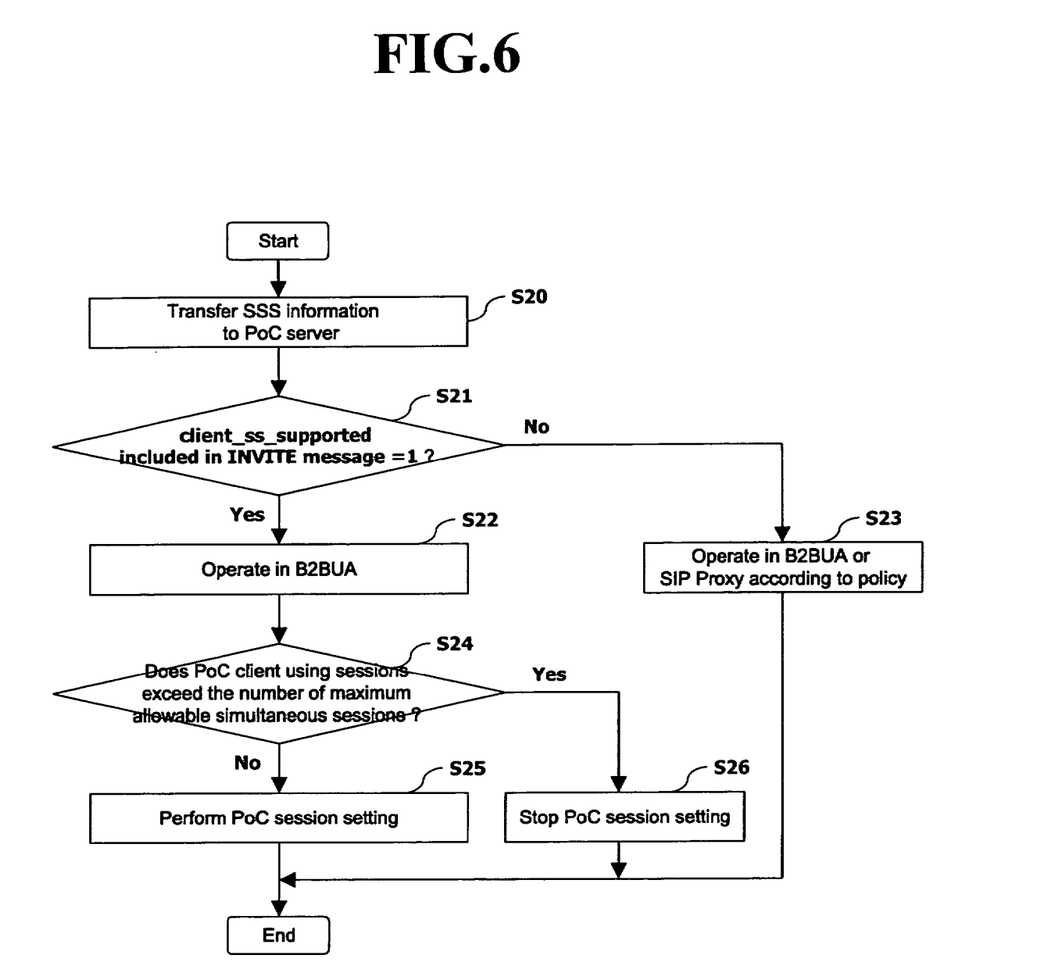
FIG. 6 is a flowchart illustrating another example of a simultaneous session control method for the PoC service according to an embodiment of the present invention.

FIG. 6 illustrates another example of a simultaneous session control method for a PoC service according to the present invention. This method is implemented in the system of FIG. 3 or 4 or can be implemented in other suitable system/device. For instance, the controllers 120 and 320 or 12 and 32 may be used to implement the steps of the method.

In the example of FIG. 6, the PoC client sends the SSS information not using the PUBLISH message but using an INVITE message.

As illustrated in FIG. 6, when the PoC client sends an INVITE message to the PoC server performing the participating PoC function, the PoC client sends the SSS information (SSS setting information) to the PoC server by including it in the header or body of the INVITE message (S20). Table 2 below shows an example of the SSS information included in the SIP body, particularly, in a Session Description Protocol (SDP) when transmitted from the PoC client to the PoC server.

That is, the PoC client sets the parameter value 'client_ss_supported' (SSS information) as a logical "1" (i.e., client_ss_supported=1), and includes this SSS information in an SDP parameter (a). If the 'client_ss_supported' value is set as a logical "0", in this example, it indicates that the PoC client does not support the simultaneous PoC session.

TABLE 2

| SDP PARAMETERS | |
| --- | --- |
| c= | IN IP6 57777::eee:fff:aaa:bbb |
| m= | audio 57787 RTP/AVP 97 |
| a= | rtpmap:97 AMR |
| a= | rtcp:57000 |
| m= | application 57790 udp TBCP |
| a= | fmtp:TBCP queuing=1;tb_priority=2 timestamp=1;client_ss_supported=1 |

Upon receiving the INVITE message including the SSS information from the PoC client, the PoC server performing the participating PoC function checks whether the logical value of the 'client_ss_supported' parameter included in the INVITE message is "1" or "0" (S21), and determines accordingly whether the PoC client supports the simultaneous PoC session.

That is, if the logical value of the 'client_ss_supported' is "1" (active), the PoC server determines that the PoC client having sent the INVITE message supports the simultaneous PoC session, and checks whether the PoC server itself supports the simultaneous PoC session. If both the PoC client and the PoC server support the simultaneous PoC session, the PoC server performing the participating PoC function decides to operates in the B2BUA mode (S22).

If the logical value of the 'client_ss_supported' is "0" (not active), on the other side, the PoC server performing the participating PoC function determines that the PoC client having sent the INVITE message does not support the simultaneous PoC session, and operates in the B2BUA or SIP proxy mode according to the operator's policy (S23). If the PoC server itself does not support the simultaneous PoC session (even through the PoC client may0, step S23 is performed.

After step S22, the PoC server performing the participating PoC function can use the number of maximum allowable simultaneous PoC sessions which can be commonly applied to all of the PoC clients to determine whether the number of sessions used by the PoC client having sent the INVITE message exceeds the number of maximum allowable simultaneous PoC sessions (S24).

According to another method, the PoC server performing the participating PoC function may use the number of maximum allowable simultaneous sessions allocated based upon the subscriber's service class to determine whether the number of simultaneous sessions used by the PoC client having sent the INVITE message exceeds the number of maximum allowable simultaneous PoC sessions.

If the number of sessions used by the PoC client does not exceed the number of maximum allowable simultaneous PoC sessions, the PoC server performs the session setting (S25). Otherwise, the PoC server stops the PoC session setting that has been requested (S26), and notifies the PoC client of this information. Steps S22-26 are identical or similar to steps S13-S17 of FIG. 5, respectively.

Also, in the example of FIG. 6 of the present invention, the PoC server performing the participating PoC function may consider that the PoC client does not support the simultaneous PoC session if the 'client_ss_supported' value is not included in the SIP body, e.g., in the SDP. If the logical value of the 'client_ss_supported' is "1" (active), the PoC server performing the participating PoC function may consider that the PoC client supports the simultaneous PoC session.

According to the present invention, when the methods of FIGS. 4-6 are applied to the all-IP-based service system of FIG. 3, the appropriate UE/client and server in the all-IP-based service system correspond respectively to the PoC client and the PoC server performing the participating PoC function of FIGS. 4-6, and the UE/client sends a message (e.g., SIP message) including information (SSS setting information) that indicates whether or not the UE/client supports a simultaneous session service. In this regard, the phrase "SSS setting information" in the present invention is not limited to the simultaneous PoC sessions support setting information, but includes simultaneous sessions support setting information applicable to any all-IP-based service. That is, the present invention can equally and fully be used, cover, or apply to services such as VoIP, Video Telephony, PT service, e-mail, MMS, SMS, Instant Message, Immediate Message, etc.

According to the present invention, the UE or client can be a mobile terminal, but is not limited thereto. Examples of the UE or client (e.g., PT client or PoC client) can be, but not limited to, a mobile phone, a UE (user equipment) for UMTS or the like, an MS (mobile station) for GSM or the like, a laptop computer, a PDA (personal digital assistant), various types of mobile terminals connected through the WLAN or other network, etc.

The method(s) of the present invention can be implemented in part by using existing computer programming language. Such computer program(s) may be stored in portable or other types of storages or memories such as hard drive, RAM, ROM, PROM, etc. associated with one or more computers or computer-based devices such as the server 300 and/or the UE/client 100. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device (e.g., server 300 or UE/client 100) for storage and implementation. The computer programs are readable using a known computer or computer-based device.

As described above, in the present invention, the UE/client notifies the server of the simultaneous sessions support information thereof, and the server determines the operation mode based upon, in part, the simultaneous sessions support information so as to control the session settings. As a result, the present invention provides an effective method and system for the server to control the simultaneous sessions for the UE/client.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of processing session based communications, the method comprising:
   transmitting, by the terminal, a PUBLISH message to a server in a network to inform whether the terminal supports simultaneous PT (Push-to) sessions,
   the PUBLISH message being used by the server to determine whether to operate in a B2BUA (Back-to-Back User Agent) mode, and including a value set to active for indicating that the terminal supports simultaneous PT sessions or set to not active for indicating that the terminal does not support simultaneous PT sessions;
   receiving, by the terminal, a response message from the server in response to the PUBLISH message;
   establishing, by the terminal based on the response message, a PT session with the server which has determined to operate in the B2BUA mode based on the value of the PUBLISH message and based on an indication that the server supports the simultaneous PT sessions; and
   sending, by the terminal via the established PT session, RTP data, RTCP data, or TBCP data to the server that operates in the B2BUA mode.

2. The method of claim 1, the value set to active indicating that the terminal can handle more than one PT session simultaneously, and the value set to not active indicating that the terminal cannot handle more than one PT session simultaneously.

3. The method of claim 1, further comprising:
receiving, by the terminal, a notification message from the server when a number of PT sessions that the terminal is involved exceeds a maximum number of allowable simultaneous PT sessions.

4. A terminal for processing session based communications, comprising:
a controller to control sessions based communications with a network;
a transmitting unit, cooperating with the controller, to transmit a PUBLISH message to a server in the network to inform whether the terminal supports simultaneous PT (Push-to) sessions, the message being used by the server to determine whether to operate in a B2BUA (Back-to-Back User Agent) mode, and including a value set to active for indicating that the terminal supports simultaneous PT sessions or set to not active for indicating that the terminal does not support simultaneous PT sessions; and
a receiving unit, cooperating with the controller, to receive a response message from the server in response to the PUBLISH message,
the controller further establishing, based on the response message, a PT session with the server which has determined to operate in the B2BUA mode based on the value of the PUBLISH message and based on an indication that the server supports the simultaneous PT sessions,
the transmitting unit further cooperating with the controller to send, via the established PT session, RTP data, RTCP data, or TBCP data to the server that operates in the B2BUA mode.

5. The terminal of claim 4, the value set to active indicating that the terminal can handle more than one PT session simultaneously, and the value set to not active indicating that the terminal cannot handle more than one PT session simultaneously.

6. The terminal of claim 4,
the receiving unit further receiving a notification message from the server when a number of PT sessions that the terminal is involved exceeds a maximum number of allowable simultaneous PT sessions.

7. A method of processing session based communications, the method comprising:
receiving, by a server, a PUBLISH message from a terminal that informs whether the terminal supports simultaneous PT (Push-to) sessions, the PUBLISH message including a value set to active for indicating that the terminal supports simultaneous PT sessions or set to not active for indicating that the terminal does not support simultaneous PT sessions;
determining, by the server, whether to operate in a B2BUA (Back-to-Back User Agent) mode based on the value of the PUBLISH message and based on whether or not the server supports the simultaneous PT sessions;
operating, by the server, in the B2BUA mode based on a result of the determining step;
establishing, by the server operating in the B2BUA mode, a PT session with the terminal; and
receiving, by the server, via the established PT session, RTP data, RTCP data, or TBCP data from the terminal.

8. The method of claim 7, further comprising:
storing, by the server, one or more settings related to simultaneous PT sessions that are included in the received PUBLISH message.

9. The method of claim 7, further comprising:
transmitting, by the server, a notification message to the terminal when a number of PT sessions that the terminal is involved exceeds a maximum number of allowable simultaneous PT sessions.

10. The method of claim 7, the step of receiving the PUBLISH message including receiving, by the server, the PUBLISH message from the terminal via an intermediate server.

\* \* \* \* \*